Feb. 6, 1962 A. F. SCHIMEK 3,019,492
DOOR MOUNTING
Filed Sept. 28, 1959 3 Sheets-Sheet 1
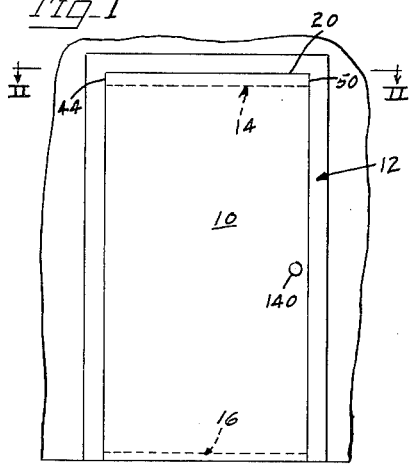
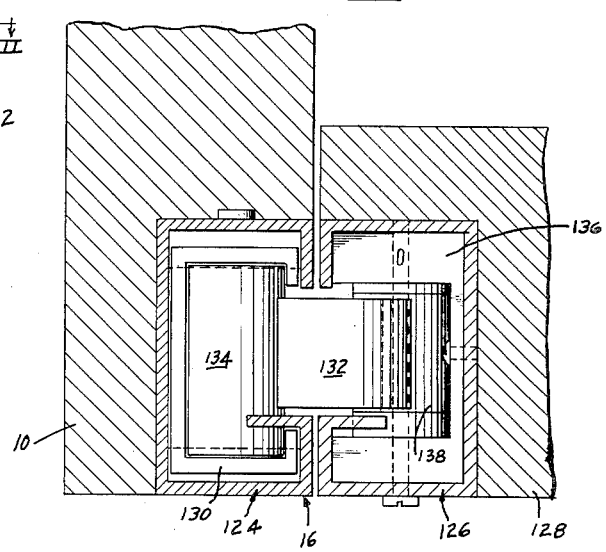
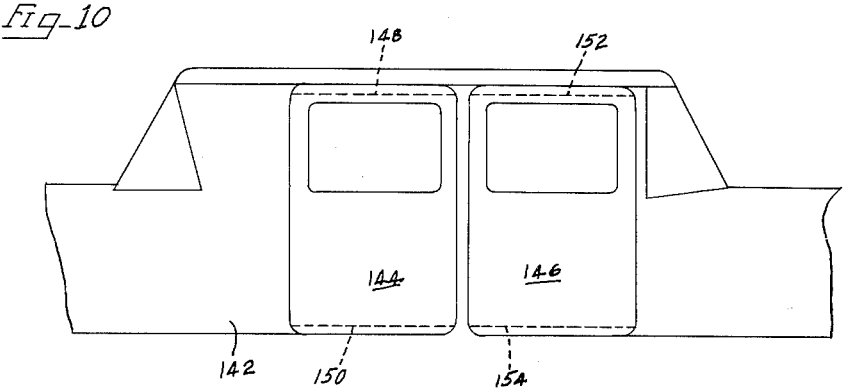
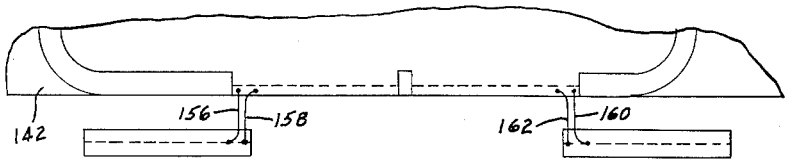
Inventor
Alfred F. Schimek
by Hill, Sherman, Meroni, Gross & Simpson
Attys.

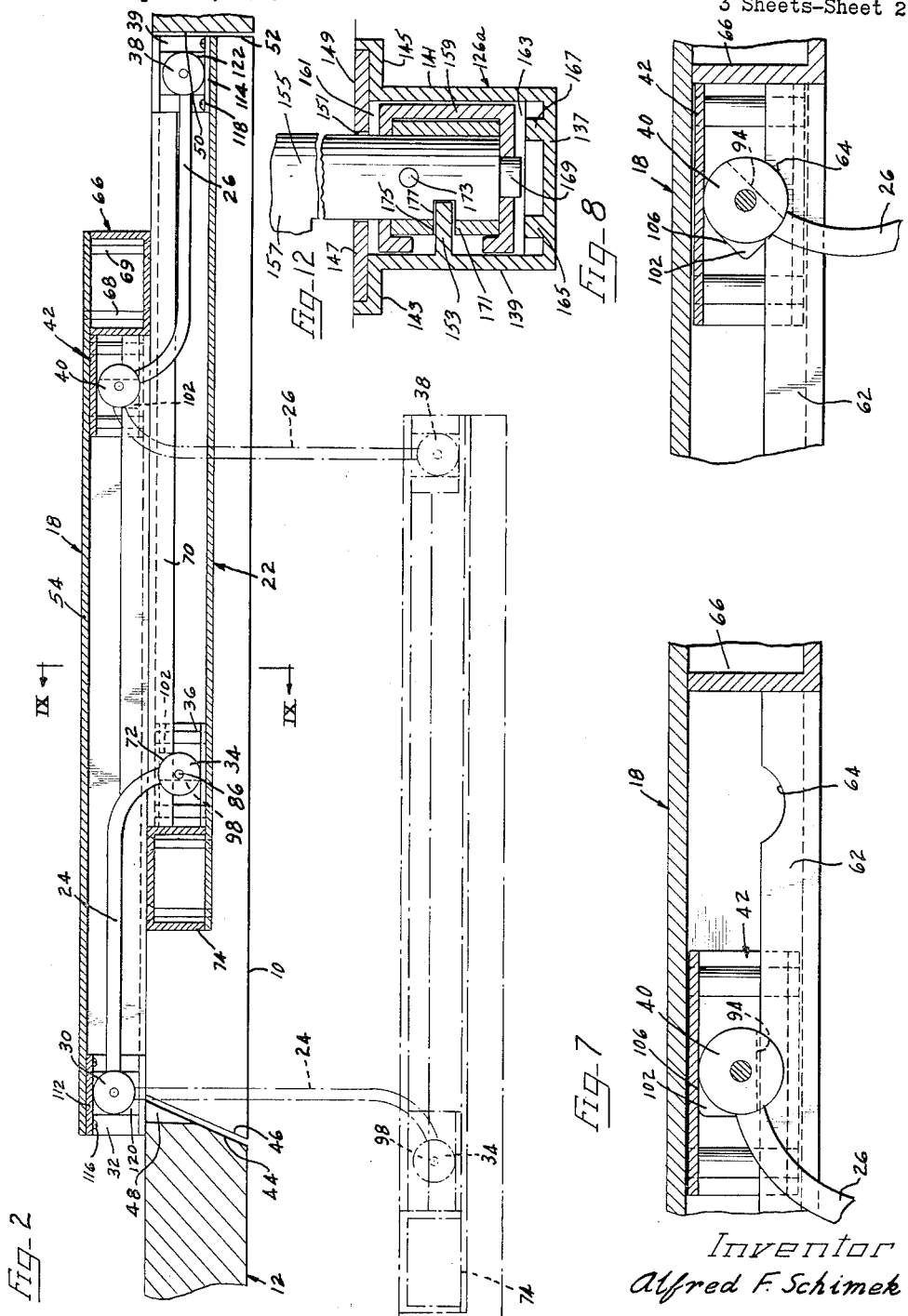

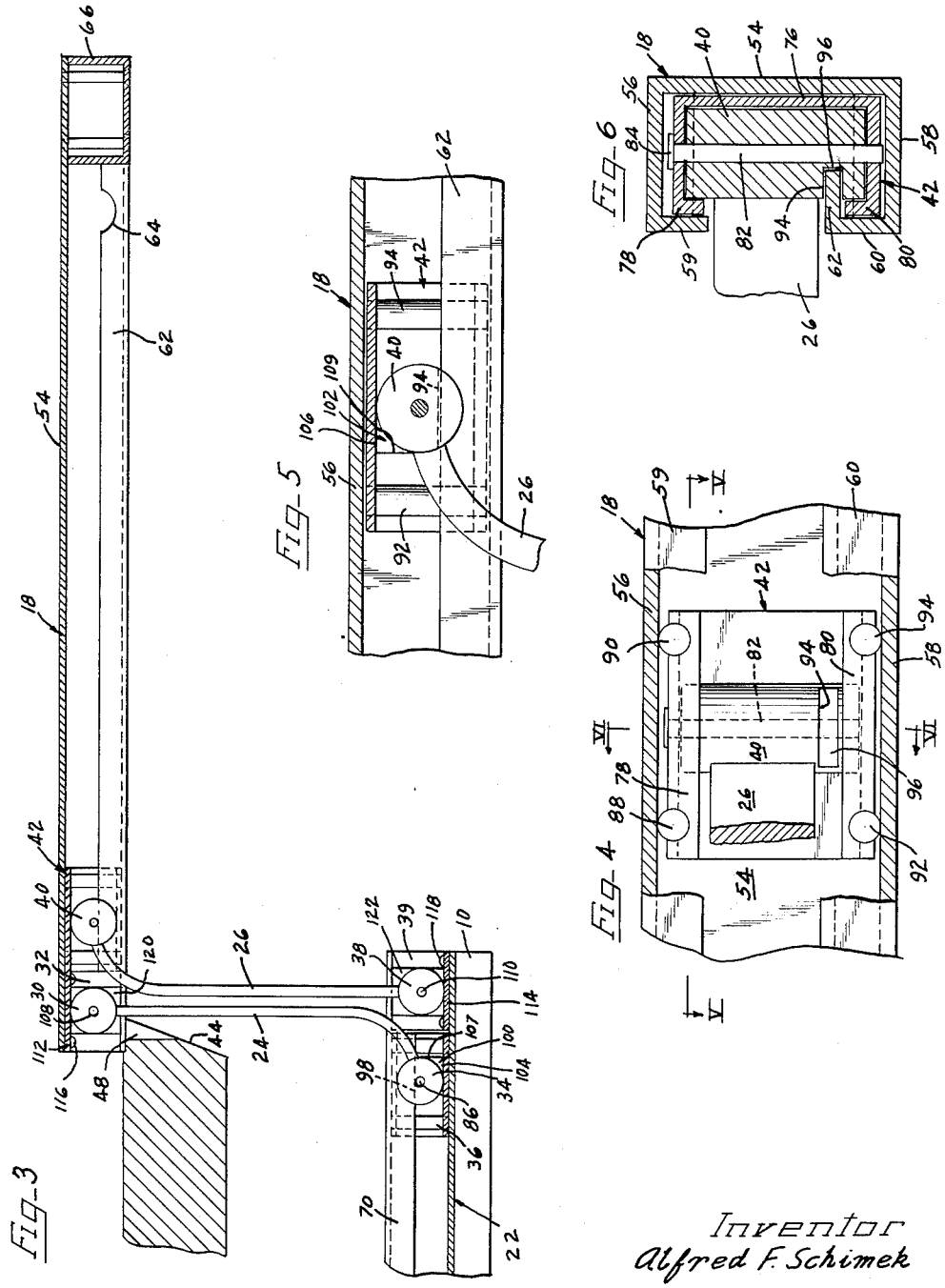

United States Patent Office 3,019,492
Patented Feb. 6, 1962

3,019,492
DOOR MOUNTING
Alfred F. Schimek, 601 N. Spring Ave.,
La Grange Park, Ill.
Filed Sept. 28, 1959, Ser. No. 842,781
15 Claims. (Cl. 20—16)

This invention relates to a door mounting, and more particularly to a mounting which will permit pivotal and slidable movement of a door for opening and closing action.

Previously available door mountings of which I am aware have either provided pivotal movement of the door around hinges or the like, or slidable movement to different locations within the door opening. The present invention affords slidable movement of the door to positions which are laterally beyond the door opening as well as pivotal movement sufficient to displace the door slightly outwardly of the door frame during opening and closing thereof. Accordingly, much less space is required for the movement of the door than with the ordinary pivotally mounted door, while the door opening is actually cleared in a manner which is not possible with the ordinary sliding door.

In accordance with the invention, a door closure may be mounted on a pair of upper pivot arms one of which is fixedly positioned relative to a track extending across the closure opening and the other of which is slidably mounted in the track. The closure is also provided with a track in register with the track in the closure frame, which slidably receives the pivot arm fixedly positioned relative to the track on the closure frame and fixedly retains the pivot arm which is slidably received in the track mounted on the closure frame. A pair of lower pivot arms and track means may also be utilized at the bottom of the door, and a plurality of door closures may also be provided for a given closure opening, if desired.

The relatively slidable end of each of the pivot arms is provided with stop means coacting with stop means formed in the track associated therewith such that slidable movement of the closure may only be effected when the closure is pivoted to its relatively outwardly spaced position with respect to the closure frame and such as to maintain the angular position of the pivot arms during such slidable movement. Stop means are also formed at the slidable ends of the pivot arms which limit the pivotal movement thereof during opening of the closure to a position wherein the arms may slide relative to the track slidably receiving them.

Accordingly, it is an object of the present invention to provide a door mounting which permits slidable movement of a closure or door to a location laterally spaced from the closure opening.

Another object of the invention is to provide a device as described which combines pivotal and slidable movement to afford a substantial reduction in the amount of space required for movement of the door in front of the door opening.

Yet another object of the invention is to provide a device as described which will not permit slidable movement of the closure until such time as the closure is pivoted to its relatively outermost position, and which will maintain such position during slidable movement of the closure.

Other objects and advantages of the invention will become apparent as the description proceeds in accordance with the drawings in which:

FIGURE 1 is a front elevational view of a closure according to the invention;

FIGURE 2 is a horizontal sectional view taken along line II—II of FIGURE 1;

FIGURE 3 is a horizontal sectional view corresponding to the view of FIGURE 2 but showing the door in open position;

FIGURE 4 is an enlarged, fragmentary vertical sectional view of a slidable connection for a pivot arm according to the invention;

FIGURE 5 is a view taken along the line V—V of FIGURE 4;

FIGURE 6 is a vertical sectional view taken along the line VI—VI of FIGURE 4;

FIGURE 7 is a view similar to the view of FIGURE 5 and showing the pivot arm structure in laterally displaced relationship to the position shown in FIGURE 5;

FIGURE 8 is a view corresponding to the view of FIGURE 5 and showing the pivot arm moving toward closing position;

FIGURE 9 is an enlarged, fragmentary vertical sectional view of a lower track structure showing the door in closed position;

FIGURE 10 is a fragmentary side elevational view showing the mounting of the invention;

FIGURE 11 is a fragmentary, horizontal sectional view, in diagrammatic form of the closure structure of FIGURE 10 in open position; and FIGURE 12 is a vertical sectional view of mounting means for the bottom end of a door.

Referring now to the drawings, a door closure 10 may be mounted in a door frame 12 for a closet or other entryway, and may be provided with upper and lower sets of tracks 14 and 16, as hereinafter set forth, although for some applications upper tracks means alone may suffice. The sets of tracks 14 and 16 may be substantially the same, and as seen in FIGURE 2 with reference to the upper set of tracks 14, each set of tracks includes an inner track 18, constructed within the upper portion 20 of door frame 12 and an outer track 22 constructed across the upper inner portion of the door 10 in horizontal registration with the track 16.

In order to provide for slidable movement of the door 10 from the closed position shown in FIGURES 1 and 2 to the open position shown in FIGURE 3, a pair of pivot arms 24 and 26 are provided, one of the pivot arms 24 being axially fixed relative to the track 18 and the other of the pivot arms 26 being axially slidable relative to the track 18. At the same time, the pivot arm 24, hereinafter referred to as the fixed pivot arm, is relatively slidable with respect to the track 22 in the door 10, while the pivot arm 26 is relatively fixed with respect to the track 22.

Thus the pivot arm 24 includes a preferably cylindrical journal boss 30 at its inner end which is pivotally retained in a fixed pivot mounting 32 at one end of the track 18, and a cylindrical journal boss 34 at its outer end which is pivotally retained in a sliding pivot carrier 36 in the track 22. Likewise, the pivot arm 26 has a cylindrical journal boss 38 pivotally secured in a fixed pivot mounting 39 at the other end of the track 22 of the closure 10, and a cylindrical journal boss 40 pivotally secured in a sliding pivot carrier 42 in the track 16.

In order to accommodate pivotal movement of the closure 10 into and out of the door opening, the frame 12 defines along one vertical side thereof adjacent the fixed pivot end 30 of the fixed pivot arm 24 a bevelled edge portion 44 having a cross-sectional angle complementary to an adjacent bevelled edge portion 46 in the door 10, and as seen in FIGURE 3, a suitable recess 48 may be cut in the frame structure to accommodate the fixed pivot arm 24.

In accordance with the invention, the fixed track 18 extends from substantially the frame edge 44 and across a major portion of the width of the closure opening, while terminating in spaced relationship to the opposite frame edge 50 by a distance substantially corresponding to the length of the pivot arms 24 and 26. Likewise, the track 22 extends from substantially the edge 52 of the door 10 across a major portion of the width of the door, terminating in spaced relation to the other edge 46 also corresponding to the length of the pivot arms 24 and 26. Accordingly, the outer end 34 of the arm 24 will be at the left hand end of the track when the door 10 is closed as shown in FIGURE 2, and will remain in this position until the door is pivoted outwardly and is slidably moved to the left, in the example, as hereinafter further described. Similarly, the outer end 38 of the pivot arm 26 is positioned at the right hand end of the fixed track 18 when the door is closed and also remains in that position until the door has been pivoted outwardly and slidably moved to the left.

In order to retain the sliding pivot carriages 42 and 36 in alignment within the fixed and movable tracks 18 and 22 respectively, each of the tracks 18 and 22 is provided with axially extending retaining flanges. The tracks 18 and 22 are formed in substantially the same manner, and as seen with respect to track 18 in FIGURES 4 through 6, they are substantially U-shaped with an inner wall indicated by reference numeral 54, upper and lower walls 56 and 58 respectively, and integral upper and lower retaining flanges 59 and 60 terminating in spaced relationship such as to accommodate free movement of the arms 24 and 26. In a preferred form of the invention, the flange 60 is turned inwardly in parallel relation to the bottom wall 58 for a predetermined distance to form a guide and locking lip 62. As seen in FIGURE 3, the lip 62 defines an arcuate recess 64 adjacent its right hand end having a radius of curvature substantially corresponding to that of the cylindrical boss 40. The end of the track may be formed with an end stop 66 which may be a rectangular bracket secured in position by screws or bolts 68 and 69, and the cut-out 64 is spaced from the end stop 66 a distance such as to be in register with the boss 40 at the right-hand-most position thereof.

The lip flange 70 of the relatively movable track 22 defines a similar arcuate cut-out 72 adjacent the left hand end thereof. As in the case of the cut-out 64, the cut-out 72 is spaced from an end stop 74 in the door 10 a distance such as to be in register with the boss 34 when the boss 34 is at the extreme left hand position relative to the track 22 as shown in FIGURE 2.

The slidable pivot carriers 36 and 42 are desirably constructed in a substantially identical manner, as will be set forth with respect to the carrier 42.

As seen in FIGURES 4 through 6, each of the carriers 36 and 42 preferably includes a C-shaped housing 76 open at the front and having upper and lower flanges 78 and 80 within the flanges 58 and 60. Thus the flanges 78 and 80 cooperate with the outer track flanges 59 and 60 to form a guide means with the overlying flange 62 providing a stop in cooperation with the lower flange 80. A pivot pin 82 having a head 84 extends vertically through the housing 76, preferably substantially in the center thereof. The pin 82 extends coaxially through the cylindrical boss 40 to pivotally retain the boss and a corresponding pin 86 is similarly retained in the boss 34 of the arm 24.

In order to afford easy slidable movement of the pivot carriers 36 and 42, upper and lower anti-friction and guide means may be provided which, in the embodiment shown, include upper cylindrical and transversely extending roller bars 88 and 90 and lower cylindrical and transversely extending roller bars 92 and 94 the upper and lower walls of the housing 76 being transversely cut to receive the roller bars, and with the upper and lower walls 56 and 58 of the track 18 serving to journal the rollers 88 through 92 in position in coextensive arcuate cuts in the wall 76 and the flanges 78 and 80. In the example shown, the rollers 88 and 90 and 92 and 94 are spaced on opposite sides of the pivot pin 84 to provide a stable support therefor. Thus the pivot arm can move easily along the entire track.

In accordance with the invention, it is desirable that the pivot arms 24 and 26 be prevented from slidable movement until such time as they have reached the outermost pivotal position thereof. In this manner, inadvertent slidable movement of the door will be prevented, and the door will always be held in a predetermined appropriately spaced relation to the frame so that there will be no damage to either structure. Accordingly, each of the pivot bosses 34 and 40 defines guide and stop means which in the illustrated embodiment are adapted to cooperate with the inwardly turned flanges or lips 62 and 70 and the notched portions 64 and 72 therein, respectively. Thus the boss 40 defines a segmental slot 94 in vertical registration with the track lip 62 and dimensioned to receive the lip when the arm 26 is pivoted outwardly to its outermost position, at which time the chord surface 96 of the slot is in parallel alignment with the track 62. However, when the carrier 42 is in abutting relation to the stop 66, the boss 40 may be pivoted so that the chord surfaces is no longer in parallel alignment with the lip 62 and therefore the cylindrical boss 40 itself forms a locking structure cooperating with the arcuate recess 64 to prevent slidable movement of the track 42 and therefore of the arm 26. As hereinbefore indicated, the cylindrical boss 34 on the arm 24 defines a similar segmental locking slot, which is designated by reference numeral 98.

In order to limit the outward pivotal movement of the arms 24 and 26 to the exact extent required to place the slots 94 and 98 in slidable alignment with the tracks 62 and 70 the bosses 34 and 40 define stop means which, in the embodiment illustrated, take the form of the stop lugs 100 and 102 respectively. The stop lugs 100 and 102 may comprise continuously extending vertical structures along the bosses 40 and 34, or may be constructed as a plurality of vertically spaced elements, but in any case define abutment surfaces 104 and 106 respectively which extend in parallel abutting relationship with the rear walls of the slidable carrier housings 76 when the arms 24 and 26 have been pivoted outwardly to their maximum extent, as seen in FIGURES 3, 5 and 7. Similarly, the other right-angularly formed edges 107 and 109 of the lugs 100 and 102 may limit inward pivotal movement of the arms, as seen in FIG. 2. It will be appreciated that other suitable stop means may also be provided within the scope of the invention, such as pin and slot means formed at the top of the bosses 34 and 40 (not shown).

The fixed pivot bosses 30 and 38 at the inner and outer ends of the arms 24 and 26, respectively, are secured in the fixed pivot housings 32 and 39 by coaxial pivot pins 108 and 110, the pivot housings 32 and 39 also providing end stops for the slidable pivot carriages 36 and 42. The housings 32 and 39 have rear walls 112 and 114 secured to the back walls of the tracks 18 and 22 by suitable bolt means, as indicated at 116 and 118. Top and bottom walls may be formed integrally with the rear walls 112 and 114, the bottom walls being referred to by reference numerals 120 and 122 respectively. The housing 32 and 39 thus have a generally C-shaped configuration, open at the front to permit free pivotal movement of the arms 24 and 26. The pivot pins 108 and 110 are suitably secured in the top and bottom walls of the housings 32 and 39, and for example, a cotter pin or the like (not shown) may be secured through the pivot pins and the upper walls, with the lower portions of the pins retained in the bottom walls 120 and 122 by threaded relationship therewith.

This fixed pivot housing construction may be seen more particularly in FIGURE 9 which illustrates the set of bottom tracks 16 as including a track 124 for the door 10 and a track 126 for floor structure 128 as well as a slidable pivot carriage 130 for a pivot arm 132 and its cylindrical boss 134 being received in the track 124 and a fixed pivot mounting 136 for the fixed pivot boss 138 of the arm 132 being positioned in the track 126. The floor structure 128 may be formed as a separate sill across a closet floor or the like as indicated in FIGURE 1, or as seen in FIGURE 12, a track 126a may be set in a suitable elongated recess in the floor itself so that the floor will be substantially flat. Thus, the track 126a includes a bottom wall 137 and side walls 139 and 141 which carry upper flanges 143 and 145 extending outwardly and upwardly to seat securely in the floor recess and to receive floor plate means indicated at 147 and 149 which form an elongated slot 151. The wall 139 has a track guide lip 153 formed integrally therewith for controlling slidable movement of an arm 155 which is turned inwardly at 157 for fixed pivotal connection with the door frame at its other end as hereinabove set forth. The arm 155 is accordingly pivotally mounted in a carrier 159 which is mounted on upper and lower sets of rollers 161 and 163, the bottom wall 137 of the track preferably having a pair of raised ridges or roller supports 165 and 167 for the rollers 161 and the upper rollers being retained beneath the floor plate means 147 and 149, whereby the arm 155 may move through the guide slot 151.

The carrier 159 is formed similarly to the carriers 36 and 42, but includes an upper opening for the arm 155, in addition to the C-shaped configuration for receiving the track guide lip 153 and may have a lower opening for receiving a boss or trunnion 169 to journal the arm 155 in cooperation with the upper opening therein. The arm 155 may have a stop sleeve 171 secured within the carrier 159 by a suitable pin 173, and in order to provide for selective control of the slidable movement of the arm in accordance with the angular position thereof as described, the sleeve 171 and the arm define aligned recesses 175 and 177 to receive the track when the arm is in a predetermined outwardly turned position. As also hereinabove described, this position may be determined by a suitable lug or stop shoulder (not shown), and which may be formed integrally on the sleeve 171 to engage the carriage 159 when the arm 155 has been suitably rotated in a cut-out portion or recess (not shown) in the track guide lip to place the recesses 175 and 177 in alignment for receiving the track guide lip and permitting the said slidable movement of the arm along the track.

As hereinabove indicated, however, the bottom track structures may be eliminated without interfering substantially with the effective operation of the door.

In opening the door, a handle or the like 140 is pulled outwardly, whereupon the pivot arms are pivoted outwardly from their position parallel to the door shown in solid line in FIGURE 2, to their maximum outward position, which is preferably at right angles to their initial positions, as shown in dotted line in FIGURE 2, and is determined initially by the stop means 100 and 102. The stop means or locking means provided by the arcuate cut-out portions 64 and 72 and the segmental slots 94 and 98 will prevent slidable movement of the door until the arms 24 and 26 are in the said maximum outward position, whereupon the slots 94 and 98 will be in slidable alignment with the track lips 62 and 70, so that the bosses 40 and 34 may slip easily leftward along the respective tracks 22 and 18. As a result of such movement, the door 10 will reach the position indicated in FIGURE 3 wherein the boss 34 is at the right hand side of the track 22 and the boss 40 is at the left hand side of the track 18. The slots 94 and 98, however, will also prevent further angular rotation of the arms during such movement.

Closing of the door is substantially effected in the reverse manner from opening thereof. As indicated, the arms 24 and 26 will not be permitted to pivot inwardly during the travel to the right until the cylindrical bosses 40 and 34 can register with the recesses 64 and 72, whereupon pivotal movement of the arms to closing position may be effected.

As seen in FIGURES 10 and 11, the door mounting of the invention may also be used with a vehicle such as the car 142, wherein doors 144 and 146 are mounted on upper and lower sets of tracks 148 and 150 and 152 and 154, respectively. When the doors 144 and 146 are opened, they will move outwardly only to the extent permitted by the length of the arms, indicated geenrally by reference numerals 156 and 158 and 160 and 162, and will then slide laterally away from the door openings to the position shown in FIG. 3. Accordingly, opening a door adjacent a curb will be possible in situations where it was not previously, and a greater degree of safety will be provided during opening and closing of doors on the side of the car away from the curb.

In an installation where a track across the door frame at the top is undesirable, the top track across the frame can be eliminated and a single pivot arm with a fixed pivot end mounted in a fixed pivot mounting fastened directly to the frame and the slidable pivot carrier retained in a track on the door. The bottom track arrangement remains as shown.

Similarly where a bottom track across the frame is undesirable, the bottom track across the frame can be eliminated using only a door track and a single arm with the fixed pivot mounting fastened directly to the frame, and the slideable pivoted carrier retained in the track on the door. The top track arrangement remains as shown.

In either of the above cases the door is then held at three points instead of four.

It will thus be seen that a door mounting has been provided which is simple, effective, and adapted for use in a variety of applications. In addition to the above-described structures, the device can be used wherever space is likely to be at a premium, e.g., in kitchen cabinets and the like, or in any situation wherein it is desirable to afford a relatively wide closure opening as well as savings in space and attractive appearance.

When more than one door is installed in opening, the doors do not lap but are flush with one another, presenting a neat continuous appearance; and depending on the mounting, the doors may also be flush with the frame, or lap the frame with a lip or lap the frame for the full thickness of the door.

Although I have herein set forth and described my invention with respect to specific principles and details thereof it will be apparent to those skilled in the art that these may be varied without departing from the spirit and scope of the invention as set forth in the hereunto appended claims.

I claim as my invention:

1. A mounting for a door or the like comprising a first track adapted to be secured across a door frame or the like, a second track adapted to be secured across a door or the like in register with the first track, a first arm pivotally and fixedly secured in one end of the first track and pivotally and slidably secured in the second track and a second arm pivotally and fixedly secured to the end of said second track further from said one end of said first track and slidably secured in said first track, said arms being spaced from one another in freely movable adjustable relationship to afford relative axial movement of said tracks.

2. A mounting for a door or the like comprising a first track adapted to be secured across a door frame or the like, a second track adapted to be secured across a door or the like in register with the first track, a first arm pivotally and fixedly secured in one end of the first track, and pivotally and slidably secured in the second track, a second arm pivotally and fixedly secured to the end of said second track further from said one end of said first track and slidably secured in said first track and means for maintaining said arms in predetermined angular relation to said tracks during slidable movement relative thereto.

3. A mounting for a door or the like comprising a first track adapted to be secured across a door frame or the like, a second track adapted to be secured across a door or the like in register with the first track, a first arm pivotally and fixedly secured in one end of the first track and pivotally and slidably secured in the second track, a second arm pivotally and fixedly secured to the end of said second track further from said one of said first track and slidably secured in said first track, means for preventing pivotal movement of said arms beyond a predetermined angular position for said arms relative to said tracks and means for maintaining said arms in said predetermined angular relation to said tracks during slidable movement relative thereto.

4. In combination with a door or the like and a frame or the like for the door, a first track secured horizontally across the door frame, a second track secured horizontally across the door in register with the first track, a first arm having one end pivotally connected to one end of said first track and fixed against axial movement along said first track, the other end of said first arm being slidably and pivotally connected to said second track, a second arm having one end pivotally connected to the end of said second track further from said one end of said first track and fixed against axial movement along said second track, the other end of said second arm being slidably and pivotally connected to said first track and means on the slidable ends of said arms and on said tracks for preventing pivotal movement of said arms during slidable movement thereof.

5. In combination with a door or the like and a frame or the like for the door, a first track secured horizontally across the door frame, a second track secured horizontally across the door in register with the first track, a first arm having one end pivotally connected to one end of said first track and fixed against axial movement along said first track, the other end of said first arm being slidably and pivotally connected to said second track, a second arm having one end pivotally connected to the end of said second track further from said one end of said first track and fixed against axial movement along said second track, the other end of said second arm being slidably and pivotally connected to said first track and means on the slidable ends of said arms and on said tracks for preventing pivotal movement of said arms during slidable movement thereof and affording pivotal movement thereof when said slidable ends are at the other ends of said tracks.

6. In combination with a door or the like and a frame or the like for the door, a first track secured horizontally across the door frame, a second track secured horizontally across the door in register with the first track, a first arm having one end pivotally connected to one end of said first track and fixed against axial movement along said first track, the other end of said first arm being slidably and pivotally connected to said second track, a second arm having one end pivotally connected to the end of said second track further from said one end of said first track and fixed against axial movement along said second track, the other end of said second arm being slidably and pivotally connected to said first track and means on the slidable ends of said arms and on said tracks for preventing pivotal movement of said arms during slidable movement thereof and affording pivotal movement thereof when said slidable ends are at the other ends of said tracks, said slidable ends including means for limiting outward pivotal movement of said arms to a position such as to afford slidable movement thereof.

7. A mounting for a door or the like comprising a first track adapted to be secured across a door frame or the like, a second track adapted to be secured across a door or the like in register with said first track, a first arm having one end pivotally secured in said first track in axially fixed relationship thereto, a first pivot carriage slidably received in said second track and pivotally securing the other end of said first pivot arm, a second arm having one end pivotally secured in the end of said second track further from said one end of said first track and a second pivot carriage slidably received in said first track and pivotally securing the other end of said second arm, said arms being freely movable in adjustably spaced relationship to one another to afford relative axial movement of said tracks.

8. A mounting for a door or the like comprising a first track adapted to be secured across a door frame or the like, a second track adapted to be secured across a door or the like in register with said first track, a first arm having one end pivotally secured in said first track in axially fixed relationship thereto, a first pivot carriage slidably received in said second track and pivotally securing the other end of said first pivot arm, a second arm having one end pivotally secured in the end of said second track further from said one end of said first track and a second pivot carriage slidably received in said first track and pivotally securing the other end of said second arm, each of said tracks having axially extending upper and lower flanges spaced to receive said pivot arms therethrough, and each of said pivot carriages having slidably coacting upper and lower flanges spaced to receive said pivot arms therethrough, said arms being freely movable in adjustably spaced relationship to one another to afford relative axial movement of said tracks.

9. A mounting for a door or the like comprising a first track adapted to be secured across a door frame or the like, a second track adapted to be secured across a door or the like in register with said first track, a first arm having one end pivotally secured in said first track in axially fixed relationship thereto, a first pivot carriage slidably received in said second track and pivotally securing the other end of said first pivot arm, a second arm having one end pivotally secured in the end of said second track further from said one end of said first track and a second pivot carriage slidably received in said first track and pivotally securing the other end of said second arm, each of said tracks having axially extending upper and lower walls and axilaly extending upper and lower flanges spaced to receive said pivot arms therethrough, and each of said pivot carriages having slidably coacting upper and lower flanges spaced to receive said pivot arms therethrough and upper and lower rollers for slidable movement along said upper and lower walls, said arms being freely movable in adjustably spaced relationship to one another to afford relative axial movement of said tracks.

10. A mounting for a door or the like comprising a first track adapted to be secured across a door frame or the like, a second track adapted to be secured across a door frame or the like in register with said first track, a first arm having an end pivotally secured at one end of said first track in axially fixed relation thereto and the other end slidably and pivotally secured in said second track, a second arm having one end pivotally secured in axially fixed position in said second track at the end thereof further from said one end of said first track and having the other end slidably and pivotally secured in said first track, an axially and inwardly extending flange each of said tracks, each of said slidable arm ends having a boss defining a slot slidable along one of said flanges in a predetermined angular position of said boss, each of said flanges having a cut-out portion registering with one of said bosses when said bosses are at the other ends of said tracks and affording angular rotation of said bosses into and out of said position for slidable movement along said flanges.

11. A mounting for a door or the like comprising a first track adapted to be secured across a door frame or the like, a second track adapted to be secured across a door frame or the like in register with said first track, a first arm having an end pivotally secured at one end of said first track in axially fixed relation thereto and the other end slidably and pivotally secured in said second track, a second arm having one end pivotally secured in axially fixed position in said second track at the end thereof further from said one end of said first track and having the other end slidably and pivotally secured in said first track, an axially and inwardly extending flange on each of said tracks, each of said slidable arm ends having a boss defining a slot slidable along one of said flanges in a predetermined angular position of said boss, each of said flanges having a cut-out portion registering with one of said bosses when said bosses are at the other ends of said tracks and affording angular rotation of said bosses into and out of said position for slidable movement along said flanges, and each of said bosses having stop means limiting outward pivotal movement of said arms to said position.

12. A mounting for a door or the like comprising a first track adapted to be secured across a door frame or the like, a second track adapted to be secured across a door frame or the like in register with said first track, a first arm having an end pivotally secured at one end of said first track in axially fixed relation thereto and the other end slidably and pivotally secured in said second track, a second arm having one end pivotally secured in axially fixed position in said second track at the end thereof further from said one end of said first track and having the other end slidably and pivotally secured in said first track, an axially and inwardly extending flange on each of said tracks, each of said slidable arm ends having a boss defining a slot slidable along one of said flanges in a predetermined angular position of said boss, each of said flanges having a cut-out portion registering with the boss associated therewith when said boss is at the other end of the tracks for said flange, said cut-out portion affording angular rotation of said boss into and out of said position for slidable movement along said flange, each of said slots being configured to coact with the flange associated therewith to prevent angular movement of the boss defining it except when said boss is in register with the cut-out portion of said flange.

13. In combination with a door or the like and a frame or the like for the door, a first track secured horizontally across the door frame, a second track secured horizontally across the door in register with the first track, a first arm having one end pivotally connected to one end of said first track and fixed against axial movement along said first track, the other end of said first arm being slidably and pivotally connected to said second track, a second arm having one end pivotally connected to the end of said second track further from said one end of said first track and fixed against axial movement along said second track, the other end of said second arm being slidably and pivotally connected to said first track and means on the slidable ends of said arms and on said tracks for preventing pivotal movement of said arms during slidable movement thereof, said arms having an equal axial dimension and said tracks having an axial dimension substantially equal to the width of said door less the length of one of said arms.

14. In combination with a door or the like and a frame or the like for the door including a floor portion, a first track secured horizontally across the door frame, a second track, and a third track set into the floor frame portion secured horizontally across the door in register with the first track, a first arm having one end pivotally connected to one end of said first track and fixed against axial movement along said first track, the other end of said first arm being slidably and pivotally connected to said second track, a second arm having one end pivotally connected to the end of said second track further from said one end of said first track and fixed against axial movement along said second track, the other end of said second arm being slidably and pivotally connected to said first track, a third arm having one end pivotally and fixedly secured to said door frame and pivotally and slidably secured in said track in said floor and means on the slidable ends of said arms and on said tracks for preventing pivotal movement of said arms during slidable movement thereof, said arms having an equal axial dimension and said tracks having an axial dimension substantially equal to the width of said door less the length of one of said arms.

15. In combination with a closure structure and a wall structure having an opening closable by said closure structure, a closure mounting connecting said closure structure to said wall structure in supporting relationship and affording pivotal movement of said closure structure in predetermined constant angular relation to said wall structure and slidable movement of said closure structure in said predetermined constant angular relationship to said wall structure, said mounting including a pair of tracks each secured to one of said structures and a pair of arms each having one end slidably engaged in one of said tracks and the other end fixedly and pivotally secured to one of said structures, said tracks and said arms defining cooperative means to prevent angular movement of said arms relative to said tracks except at a predetermined position of said arms axially of said tracks, while affording slidable movement of said arms along said tracks, said arms at said one end thereof and said tracks forming cooperative means to permit angular movement of said arms relative to said tracks at said predetermined position axially of said tracks.

References Cited in the file of this patent

UNITED STATES PATENTS

| | | |
|---|---|---|
| 1,117,798 | Cutler | Nov. 17, 1914 |
| 2,227,849 | Soss | Jan. 7, 1941 |
| 2,956,836 | James et al. | Oct. 18, 1960 |

FOREIGN PATENTS

| | | |
|---|---|---|
| 698,436 | France | Jan. 30, 1931 |
| 389,061 | Great Britain | 1933 |
| 483,612 | Canada | May 27, 1952 |